(No Model.)

R. B. PUMPHREY.
Meat Slicing Machine.

No. 241,564. Patented May 17, 1881.

Witnesses:
Geo. A. Boyden.
A. E. Eader

Inventor:
Robert B. Pumphrey
By his Atty
Chas. B. Mann

N. PETERS, Photo-Lithographer, Washington, D. C.

UNITED STATES PATENT OFFICE.

ROBERT B. PUMPHREY, OF BALTIMORE, MARYLAND.

MEAT-SLICING MACHINE.

SPECIFICATION forming part of Letters Patent No. 241,564, dated May 17, 1881.

Application filed April 14, 1880. (No model.)

*To all whom it may concern:*

Be it known that I, ROBERT B. PUMPHREY, of the city of Baltimore and State of Maryland, have invented a new and useful Improvement in Meat-Slicing Machines, of which the following is a specification.

My invention relates particularly to an apparatus for slicing canned meat and other articles of food, the object being to employ a knife, which may be held in the hand in the usual manner, to make the cut, and which, upon being moved in effecting the cut, will operate mechanism, whereby the block of meat will be moved or fed forward, as hereinafter set forth.

Figure 1:
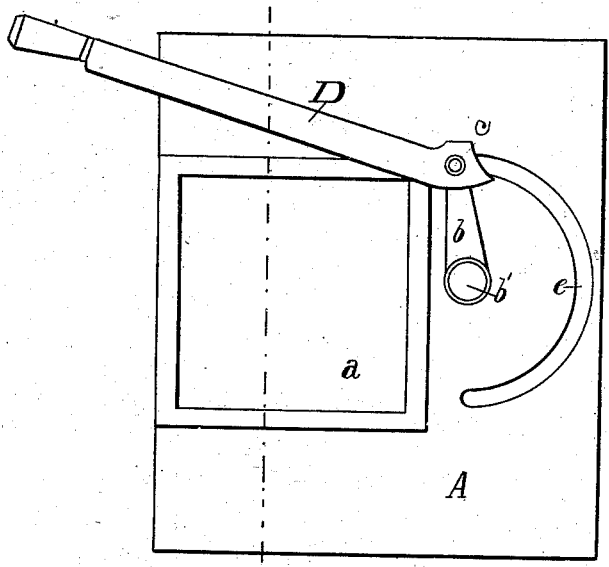
Figure 2:
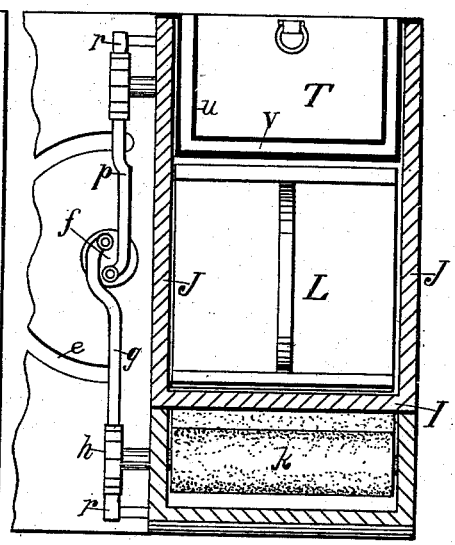
Figure 3:
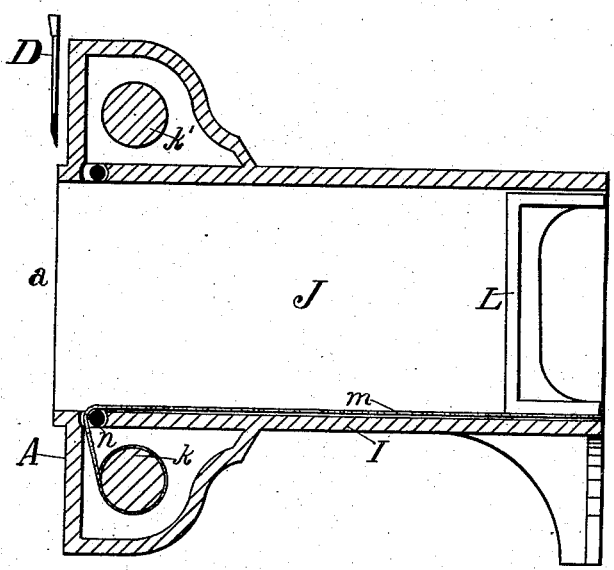
Figure 4:
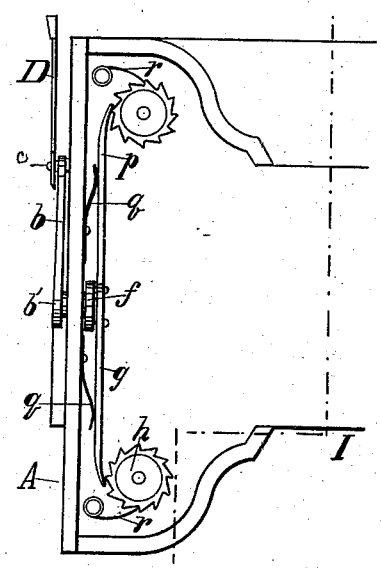

In the drawings hereto annexed, Figure 1 is a front-end view of the apparatus. Fig. 2 is a cross-section, showing the rear view of the front end. Fig. 3 is a longitudinal section. Fig. 4 is a side elevation.

The letter A designates the front-end plate, which I prefer to make of cast-iron. This plate forms the rectangular opening $a$, which limits the size in cross-section of the meat that can be cut.

I designates the bottom of a rectangular box, which corresponds in size to the opening, and J the side walls of the box. At one side of the opening a crank-arm, $b$, is pivoted at $b'$, having at its extremity a pin, $c$. The knife D has at its extremity a hole, which receives the pin. In the present instance the front plate has an arc-shaped slot, $e$, the center of whose circle is in the pivot $b'$, and a lug formed on the back of the crank-arm is adapted to slide in the slot as the arm is partly rotated back and forth. On the rear side of the front plate the pivot $b'$ projects, and a crank-head, $f$, is mounted thereon. A rod, $g$, is pivoted to the crank-head, and its end is slightly curved to adapt it to engage with the ratchet-wheel $h$ on the projecting end of a shaft which extends crosswise of the box below the bottom. A roller, $k$, is mounted on this shaft.

The letter L designates a follow-block, which is adapted to slide in the box, and a strip of muslin, $m$, or any suitable cloth, is attached by one end to the follow-block, as shown in Fig. 3, and passes over a friction-roller, $n$, which is near the forward end of the box, and is flush with the bottom, and winds upon the roller $k$. A spring, $q$, placed back of the rod $g$, serves to keep it engaged with the ratchet, and a spring-click, $r$, by engagement with the ratchet-wheel, serves to prevent its backward motion.

It will be seen that by turning the roller the cloth is wound thereon and the follow-block is dragged forward.

If desired, a similar roller, to wind a strip of muslin connected to the top of the follow-block, may be arranged in the upper part of the box, and said roller (designated by the letter $k'$) may be operated by a ratchet-wheel, with which a rod, $p$, engages.

The apparatus operates as follows: The meat to be cut is placed in the box on the cloth and against the follower. It is brought forward by turning the roller $k$ until it projects slightly from the front end and the knife starts from the uppermost point at which it is held by the crank-arm, and, guided thereby, cuts a slice from the portion which projects. The return of the knife to its uppermost position causes the rod $g$ to move the ratchet, which partly revolves the roller $k$, and by winding on the cloth feeds the meat forward preparatory to the cutting of another slice.

Figs. 2 and 4 illustrate means intended to keep the meat in good condition in warm weather while being cut, and is designed particularly for the use of market-men, who retail the meat known as "canned corn-beef." The sides of the box are extended higher and the wood top is dispensed with. A sheet-metal vessel, T, having double walls $u$, with a space, $v$, between the walls, is inserted in the entire upper part, so that the bottom of the vessel shall just be above the meat. The vessel is to contain ice, and the double walls are to prevent condensation of moisture on the outer side.

Having described my invention, I claim and desire to secure by Letters Patent of the United States—

1. In an apparatus for slicing meat, the combination, with the box, of a strip of cloth or other suitable material placed within the box on the bottom, a roller on which the strip may be wound, a ratchet-wheel, $h$, on the shaft upon which the roller is mounted, a vertically-reciprocating rod, g, to engage with the ratchet, and a crank-head, f, to which the rod is pivoted, as set forth.

2. In a machine for slicing meat, the combination, with the open-top box in which the meat is moved forward to the knife, of a vessel adapted to contain ice inserted in the open top of the box with the bottom of the vessel just above the meat-passage, as set forth.

ROBERT B. PUMPHREY.

Witnesses:
JNO. T. MADDOX,
CHAS. B. MANN.